US012767839B2

(12) United States Patent
Ogura

(10) Patent No.: US 12,767,839 B2
(45) Date of Patent: Oct. 20, 2026

(54) COMPOSITE COLORED PARTICLE

(71) Applicant: MITSUBISHI PENCIL COMPANY, LIMITED, Tokyo (JP)

(72) Inventor: Kosuke Ogura, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 870 days.

(21) Appl. No.: 17/804,196

(22) Filed: May 26, 2022

(65) Prior Publication Data

US 2022/0380612 A1 Dec. 1, 2022

(30) Foreign Application Priority Data

May 28, 2021 (JP) ................................ 2021-090118

(51) Int. Cl.
*C09D 11/17* (2014.01)
*C09D 11/18* (2006.01)
(Continued)

(52) U.S. Cl.
CPC .............. *C09D 11/17* (2013.01); *C09D 11/18* (2013.01); *C09D 133/08* (2013.01); *C09D 175/02* (2013.01); *C09D 175/04* (2013.01)

(58) Field of Classification Search
CPC ...... C09D 11/17; C09D 11/18; C09D 133/08; C09D 175/02
See application file for complete search history.

(56) References Cited

U.S. PATENT DOCUMENTS 8,680,174 B2 3/2014 Hiraishi et al.
2004/0109958 A1* 6/2004 Nigam .................. B41M 5/506 428/32.1
(Continued)

FOREIGN PATENT DOCUMENTS

EP 0 874 028 A1 10/1998
JP 62-215671 A 9/1987
(Continued)

OTHER PUBLICATIONS

Machine English translation of Idokawa Hiroyuki, JP-H10259337-A, Sep. 29, 1998. (Year: 1998).*
(Continued)

*Primary Examiner* — Coris Fung
*Assistant Examiner* — Caroline D. Liott
(74) *Attorney, Agent, or Firm* — Oblon, McClelland, Maier & Neustadt, L.L.P.

(57) ABSTRACT

Composite colored particles may include resin particles carrying a positive electric charge on particle surfaces and dye-containing particles carrying a negative electric charge on particle surfaces, the resin particles and the dye-containing particles forming a composite through Coulomb force. A water-based ink composition may include such composite colored particles dispersed in a water-based medium. A writing instrument may contain the water-based ink composition. A method of producing such composite colored particles may include forming a composite by mixing a resin emulsion containing resin particles carrying a positive electric charge on particle surfaces and a colored resin dispersion containing dye-containing particles carrying a negative electric charge on particle surfaces.

16 Claims, 1 Drawing Sheet

(51) Int. Cl.

| | |
|---|---|
| ***C09D 133/08*** | (2006.01) |
| ***C09D 175/02*** | (2006.01) |
| ***C09D 175/04*** | (2006.01) |

(56) References Cited

U.S. PATENT DOCUMENTS

| | | | | |
|---|---|---|---|---|
| 2004/0147630 | A1 | 7/2004 | Schmid et al. | |
| 2006/0036002 | A1 | 2/2006 | Schmid et al. | |
| 2007/0167537 | A1* | 7/2007 | Taguchi | C09D 11/328 523/160 |
| 2009/0062171 | A1* | 3/2009 | Song | C11D 3/40 510/276 |
| 2009/0197996 | A1 | 8/2009 | Schmid et al. | |
| 2011/0306708 | A1 | 12/2011 | Hiraishi et al. | |
| 2013/0089369 | A1* | 4/2013 | Friswell | C10L 1/003 508/459 |
| 2014/0291585 | A1* | 10/2014 | Tozuka | C09D 7/70 252/500 |
| 2015/0299942 | A1* | 10/2015 | Hong | C08L 75/04 442/59 |
| 2019/0367755 | A1* | 12/2019 | Ohno | C09D 11/18 |

FOREIGN PATENT DOCUMENTS

| | | | | |
|---|---|---|---|---|
| JP | H10259337 | A | * | 9/1998 |
| JP | 2001220528 | A | * | 8/2001 |
| JP | 2006-301217 | A | | 11/2006 |
| JP | 2010150331 | A | * | 7/2010 |
| JP | 2013-136742 | A | | 7/2013 |
| JP | 2017-12998 | A | | 1/2017 |
| WO | WO 2010/071185 | A1 | | 6/2010 |

OTHER PUBLICATIONS

Machine English translation of Fujita Katsuyuki, JP-2010150331-A, Jul. 8, 2010. (Year: 2010).*

Machine English translation of Maruyama Kazunori, JP-2001220528-A, Aug. 14, 2001. (Year: 2001).*

Extended European Search Report issued Oct. 24, 2022, in corresponding European Patent Application No. 22175294.2, 7 pages.

* cited by examiner

COMPOSITE COLORED PARTICLE

CROSS-REFERENCE TO RELATED APPLICATIONS

The present application claims the benefit of the filing date of Japanese Appl. No. 2021-090118, filed on May 28, 2021, the content of which is incorporated by reference.

BACKGROUND OF INVENTION

Technical Field of Invention

The present invention relates to an ink composition for a writing instrument and a composite colored particle contained in the ink composition.

DESCRIPTION OF BACKGROUND ART

In ink for writing instruments, an ink composition in which various dyes or pigments, which are coloring materials, are dissolved or dispersed in a solvent is used. In particular, while water-based ink compositions allow writing with little pressure, some characteristics as writing instruments of the water-based ink compositions may be inferior to those of oil-based ink compositions, and need to be improved.

For example, as an ink composition for a ballpoint pen having excellent water resistance of marking and achieving good drying property of marking and pen tip drying resistance, Patent Document 1 describes an O/W type emulsion ink composition for a ballpoint pen, the O/W type emulsion ink composition at least containing: an oil-based ink component; an emulsifying agent component; a sugar alcohol that is solid at 20° C.; and water, the oil-based ink component containing at least an oil-soluble dye as a colorant, and an organic solvent capable of dissolving the dye and having solubility of 5 g or less in 100 g of water at 20° C., the oil-based ink component being emulsified and dispersed in the water. It is described that an ink composition having excellent water resistance of marking and achieving good drying property of marking and pen tip drying resistance can be obtained.

In Patent Document 2, described is a method of manufacturing a microcapsule in which a functional substance is encapsulated in a film containing a methylol melamine condensation product of a maleic anhydride copolymer and a compound of a maleic anhydride copolymer and an organic amine having 6 or more carbons, the method including emulsifying and dispersing a functional substance such as a dye, a maleic anhydride copolymer, methylol melamine, and an organic amine salt having 6 or more carbons in a water-based medium and subjecting the obtained water-based emulsion dispersion liquid to polycondensation by heating. The microcapsule obtained as described above rapidly releases the functional substance such as a dye by applied pressure.

CITATION LIST

Patent Document 1: JP 2013-136742 A
Patent Document 2: JP 2017-012998 A

SUMMARY OF INVENTION

In the case of writing on a surface of a fibrous material such as cloth by using a writing instrument containing ink, the ink may soak into the fibrous material and a phenomenon that the marking looks blurry often occurs. Furthermore, when rubbed, the marking may be erased or faded. Thus, the ink used for a writing instrument is required to have a performance to resist these, and improvements therefor are continuously made.

Furthermore, because writing instruments are products that tend to be mass-produced as daily necessities, ink and its components for use in the writing instruments must be well-produced industrially.

An object of the present invention is to provide a water-based ink composition that has excellent performances such as anti-blurring and scratch resistance of markings, and a writing instrument containing such a water-based ink composition. In particular, an object of the present invention is to provide a composite colored particle that is blended in a water-based ink composition and a production method of same.

As a result of diligent research, the inventor of the present invention has come up with an idea of using the Coulomb force to form a composite with a colorant and a resin particle, and thus completed the present invention.

That is, the present invention relates to a composite colored particle including a resin particle carrying a positive electric charge on a particle surface and a dye-containing particle carrying a negative electric charge on a particle surface, the resin particle and the dye-containing particle forming a composite through the Coulomb force.

Furthermore, the present invention relates to a water-based ink composition in which the composite colored particles are dispersed in a water-based medium, and a writing instrument containing the water-based ink composition.

Furthermore, the present invention relates to a method of producing a composite colored particle, the method comprising forming a composite by mixing a resin emulsion containing a resin particle carrying a positive electric charge on a particle surface and a colored resin dispersion containing a dye-containing particle carrying a negative electric charge on a particle surface.

Note that, in the present invention, the Coulomb force refers to an attractive force (electrostatic force) that exerted on charged particles with positive and negative electric charge signs. Furthermore, "carrying a positive (or negative) electric charge on a particle surface" means that the particle has a positive (or negative) electric charge at least on its surface and includes a case where only the particle surface has a positive (or negative) electric charge, and also a case where the particle surface has a positive (or negative) electric charge because the inside of the particle has a positive (or negative) electric charge.

According to the present invention, a water-based ink composition that has excellent writing performance, such as anti-blurring and excellent scratch resistance of markings, and a writing instrument, such as a ballpoint pen or a marking pen, containing the water-based ink composition are provided.

According to the present invention, composite colored particles blended in the water-based ink composition, and a production method suited for the industrial production thereof are provided.

BRIEF DESCRIPTION OF DRAWINGS

FIG. 1 illustrates a formation of a composite colored particle having a large particle size where a resin particle carrying a positive electric charge on a particle surface is combined with a dye-containing particle carrying a negative electric charge on the particle surface by the Coulomb force.

Figure 1:
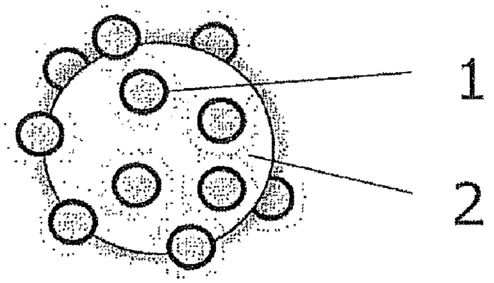
FIG. 1 is a schematic view for explaining an example of the present invention.

Note that, in the present invention, the particle size distribution of the cationic resin particles and the composite colored particles can be measured by a laser diffraction analysis, and the particle size distribution of the anionic dye-containing particles can be measured by a dynamic light scattering method.

DETAILED DESCRIPTION OF INVENTION

An embodiment of the present invention is described below in detail. However, in the present invention, components may be added or modified within a range that does not deviate from the gist of the present invention, and the technical scope of the present invention is not limited to the described embodiments and includes the invention described in the claims and equivalents thereof.

Cationic Resin Particle

The resin particle used in the present invention is a resin particle carrying a positive electric charge on its particle surface (hereinafter, also referred to as a cationic resin particle). Such a resin particle includes a polymer modified with a cationic group, and specific examples include a resin particle in which a positive electric charge is imparted by attaching or reacting a reagent to the resin particle, and a resin particle in which a monomer containing a functional group carrying a positive electric charge or a precursor thereof are allowed to coexist at the time of preparation of the resin particle and thus the formed polymer is cationized.

As the resin particle used in the present invention, a resin particle containing a polymer having a cationic group is preferably used. It is preferable that the resin particle mainly contains at least one type of polymer selected from the group consisting of a vinyl acetate-based resin, an acrylic resin, and a urethane-based resin, which are modified with a cationic group.

Cationic Resin Particle of Vinyl Acetate-Based Resin

The cationic resin particles of the vinyl acetate-based resin are preferably cationic resin particles polymerized by adding a cationic auxiliary agent, such as a cationic monomer or a cationic emulsifying agent, in addition to the vinyl acetate monomer. For example, production is performed by using a cationic emulsifying agent, forming protective colloid using a polymer having a cationic group, or adding a cationic monomer to perform inverse emulsion polymerization, at the time of polymerization using a vinyl acetate monomer alone or a mixture of a vinyl acetate monomer and a comonomer that is copolymerizable with the vinyl acetate monomer, such as vinyl chloride or a (meth)acrylic monomer.

Preferably, the cationic resin particles of the vinyl acetate-based resin can be produced by emulsion polymerization using a cationic surfactant as a cationic emulsifying agent. Examples of the cationic surfactant include alkyl benzyl ammonium chloride, such as tetradecyl dimethyl benzyl ammonium chloride and octadecyl dimethyl benzyl ammonium chloride; alkyl pyridinium ammonium chloride, such as lauryl pyridinium chloride; tetraalkyl ammonium chloride, such as stearyl trimethyl ammonium chloride and dioleyl dimethyl ammonium chloride; EO addition type ammonium chloride having an alkyl group of 8 to 18 carbons and having the molar quantity of ethylene oxide addition of 2 to 15 times, such as alkyl bis(2-hydroxyethyl) methyl ammonium chloride and polyoxyethylene alkyl methylammonium chloride. The amount of the cationic surfactant used in the emulsion polymerization is preferably 1 to 10 parts by mass, and more preferably 2 to 5 parts by mass, per 100 parts by mass of the monomer.

Furthermore, after emulsion polymerization is performed by using a nonionic surfactant, a cationic substance, such as a cationic surfactant, polyoxyethylene alkyl amine, polyethylenimine, etc. is added to produce cationic resin particles of a vinyl acetate-based resin.

Also, into a (meth)acrylic monomer, or into a mixture of the (meth)acrylic monomer and a styrene-based comonomer, an amino group-containing monomer, such as an N-substituted amino alkyl(meth)acrylate, which includes dimethylaminoethyl (meth)acrylate and diethylaminoethyl (meth)acrylate, or an N-substituted amino alkyl (meth)acrylamide, which includes dimethylaminopropyl (meth)acrylamide, is added and copolymerized, and then quaternized by an alkylating agent to produce cationic resin particles of a vinyl acetate-based resin.

As the alkylating agent, an alkyl halide such as octyl chloride, octyl bromide, dodecyl chloride, dodecyl bromide, tetradecyl chloride, tetradecyl bromide, hexadecyl chloride, or hexadecyl bromide is used.

Cationic Resin Particle of Acrylic Resin

The cationic resin particles of the acrylic resin are preferably cationic resin particles polymerized by adding a cationic auxiliary agent, such as a cationic monomer or a cationic emulsifying agent, in addition to the acrylic monomer. For example, production is performed by using a cationic emulsifying agent, forming protective colloid using a polymer having a cationic group, or adding a cationic monomer to perform inverse emulsion polymerization, at the time of polymerization using (meth)acryl monomers alone or a mixture of a (meth)acryl monomer and a comonomer that is copolymerizable with (meth)acryl monomer.

Preferably, the cationic resin particles of the acrylic resin can be produced by emulsion polymerization using a cationic surfactant as a cationic emulsifying agent. Examples of the cationic surfactant include alkyl benzyl ammonium chloride, such as tetradecyl dimethyl benzyl ammonium chloride and octadecyl dimethyl benzyl ammonium chloride; alkyl pyridinium ammonium chloride, such as lauryl pyridinium chloride; tetraalkyl ammonium chloride, such as stearyl trimethyl ammonium chloride and dioleyl dimethyl ammonium chloride; EO addition type ammonium chloride having an alkyl group of 8 to 18 carbons and having the molar quantity of ethylene oxide addition of 2 to 15 times, such as alkyl bis(2-hydroxyethyl)methyl ammonium chloride and polyoxyethylene alkyl methylammonium chloride. The amount of the cationic surfactant used in the emulsion polymerization is preferably 1 to 10 parts by mass, and more preferably 2 to 5 parts by mass, per 100 parts by mass of the monomer.

Furthermore, after an acrylic monomer is emulsion-polymerized by using a nonionic surfactant, a cationic substance, such as a cationic surfactant, polyoxyethylene alkyl amine, polyethylenimine, etc. is added to produce cationic resin particles of an acrylic resin.

Also, into a (meth)acrylic monomer, or into a mixture of the (meth)acrylic monomer and a styrene-based comonomer, an amino group-containing monomer, such as N-substituted amino alkyl (meth)acrylate, which includes dimethylaminoethyl (meth)acrylate and diethylaminoethyl (meth) acrylate, or an N-substituted amino alkyl (meth)acrylamide, which includes dimethylaminopropyl (meth)acrylamide, is added and copolymerized, and then quaternized by an alkylating agent to produce cationic resin particles of an acrylic resin. As the alkylating agent, an alkyl halide such as octyl chloride, octyl bromide, dodecyl chloride, dodecyl bromide, tetradecyl chloride, tetradecyl bromide, hexadecyl chloride, or hexadecyl bromide is used.

Cationic Resin Particle of Urethane-Based Resin

As the cationic resin particles of a urethane-based resin, cationic resin particles of a urethane-based resin having a quaternary ammonium group are preferred. For these cationic resin particles, for example, cationic resin particles of a urethane-based resin having a quaternary ammonium group can be produced by making a dispersion liquid of polyurethane by reacting a polyol, a polyisocyanate, and a tertiary amino group-containing polyol with or without a solvent, and then subjecting the tertiary amino group in the polyurethane to protonation by an acid or quaternization by an alkylating agent.

As another production method, after a urethane prepolymer having an isocyanate group at a terminal is produced by reacting a predetermined ratio of a polyol, a polyisocyanate, and a tertiary amino group-containing polyol in a solvent or without a solvent, the chain of the urethane prepolymer is elongated by using a polyamine, and a dispersion liquid of the urethane resin particles is produced. Then, the tertiary amino group in the urethane resin is subjected to protonation by an acid or quaternization by an alkylating agent. By this, the cationic resin particles of the urethane-based resin having the quaternary ammonium group are produced.

The alkylating agent for quaternization of the tertiary amino group is a reagent that forms a quaternary ammonium cation by adding an alkyl group to an amino group. An alkyl halide such as octyl chloride, octyl bromide, dodecyl chloride, dodecyl bromide, tetradecyl chloride, tetradecyl bromide, hexadecyl chloride, or hexadecyl bromide is preferably used.

The cationic resin particles used in the present invention are preferably cationic resin particles having less content of fine particles and having a uniform particle size. Specifically, in the particle size distribution, preferably at least 95% of the particles are particles having a particle size within a range of 0.1 μm to 3.0 μm, and more preferably at least 95% of the particles are particles having a particle size within a range of 0.1 μm to 2.0 μm.

Anionic Dye-Containing Particle

The dye-containing particle used in the present invention carries a negative electric charge on a particle surface and is a resin particle containing a dye (also simply referred to as dye-containing particle). The dye-containing particle includes a particle containing a dye inside or on a surface of an anionic resin particle and a particle containing an anionic dye inside or on a surface of a resin particle, and is particularly preferably a fine particle containing a dye inside or on a surface of an anionic resin particle.

As the resin particle used in the production of the particle containing a dye inside or on a surface of an anionic resin particle, a particle comprising a resin to which an anionic functional group (hereinafter, referred to as anionic group) is chemically bonded or a particle comprising a resin to which an anionic group is physically attached can be used.

As a resin constituting the resin particle having an anionic group, a thermoplastic resin or a thermosetting resin can be used, and at least one type of resin selected from the group consisting of acrylic resins, urea-based resins, urethane-based resins, and urea-urethane-based resins can be preferably used. The structure of the resin may be straight-chain or branched.

In the case where an anionic group is allowed to chemically bond to the resin particle surface, a reagent having an anionic group or a precursor thereof may be directly bonded to the resin or indirectly bonded to the resin with another atomic group interposing therebetween. Examples of another atomic group for bonding the anionic group and the resin include straight-chain or branched alkylene groups having 1 to 12 carbons, phenylene groups, naphthylene groups, carbonyl groups, ester groups, ether groups, amide groups, amino groups, azo groups, and sulfonyl groups.

As the resin particle to which an anionic group is directly bonded to a resin, a particle comprising a resin obtained by polymerizing a monomer mixture containing a monomer having an anionic group or a monomer mixture containing an auxiliary agent, such as an emulsifying agent having an anionic group, in a dissolved or dispersed state together with a dye can be used. Furthermore, a particle having an anionic group formed on a particle surface by a chemical treatment of the resin particle can be also used. Examples of the anionic group include a carboxyl group, a sulfonic acid group, and a phosphoric acid group.

The acrylic resin having an anionic group can be obtained by, for example, performing polymerization by using a (meth)acrylic acid having a carboxyl group or a (meth) acrylate having an anionic group, such as a carboxyl group or a sulfonic acid group, as a monomer. The urea-based resin having an anionic group can be obtained by, for example, performing polymerization by using a compound having an anionic group for at least one selected from a combination of a polyisocyanate compound and a polyamine compound. The urethane-based resin having an anionic group can be obtained by, for example, performing polymerization by using a compound having an anionic group for at least one selected from a combination of a polyisocyanate compound and a polyol compound. The urea-urethane-based resin having an anionic group can be obtained by, for example, performing polymerization by using a compound having an anionic group for at least one type selected from a combination of a polyisocyanate compound, a polyamine compound, and a polyol compound.

The chemical treatment for introducing an anionic group on a resin surface can be performed by a method of introducing an anionic group such as a carboxyl group, a sulfonic acid group, or a phosphoric acid group by performing a coupling reaction on a resin by a diazonium salt.

Furthermore, by subjecting a resin to an oxidation treatment that is a gas phase method, a liquid phase method, or a combination of these, an anionic group such as a carboxyl group can be introduced. In a case where the oxidation treatment is performed by a gas phase method, examples thereof include a method by which a resin is oxidized by being brought into contact with ozone or oxygen as an oxidizing agent.

In the case where the oxidation treatment is performed by a liquid phase method, as the oxidizing agent, chlorine, hydrogen peroxide solution, nitric acid, sulfuric acid, chlorate, or persulfate can be used. For example, by charging a resin in an aqueous solution containing the oxidizing agent, a resin having an anionic group on a surface can be obtained.

In the case where the anionic group is physically attached to a surface of a resin particle, examples of the method include a method of attaching an anionic polymer dispersing agent to a resin surface by supplying the anionic polymer dispersing agent to a dispersion liquid of resin particles, and a method, in which resin particles are charged in an anionic reagent solution and then the solvent is removed to coat the resin surface with the anionic reagent.

As the dye to be used, any of the following, acidic dyes, basic dyes, direct dyes, and oil-soluble dyes can be used, and natural substance derived dyes and synthetic dyes may also be used. Two or more types of non-anionic dyes or anionic dyes may be mixed, or a non-anionic dye and an anionic dye may be mixed for use.

Examples of the acidic dye include eosine, phloxine, acid red, water blue, brilliant blue FCF, and nigrosine.

Examples of the basic dye include di- or triarylmethane dyes, such as methyl violet; quinonimine dyes, such as azine-based (including nigrosine), oxazine-based, and thiazine-based quinonimine dyes; xanthene dyes, such as rhodamine; triazole azo dyes; thiazole azo dyes; benzothiazole azo dyes; azo dyes; methine dyes, such as polymethine-based, azomethine-based, and azamethine-based methine dyes; anthraquinone dyes; and phthalocyanine dyes, and among these, a water-soluble basic dyes are preferred.

Examples of the direct dye include Direct Black 154 and Direct Sky Blue. Examples of the oil-soluble dye include monoazo, diazo, metal complex salt-type monoazo, anthraquinone, phthalocyanine, and triarylmethane. Also, halochromic oil-soluble dyes obtained by substituting functional groups of acid and basic dyes with hydrophobic groups can be used as well.

As the oil-soluble dye, examples of yellow oil-soluble dye include C. I. Solvent Yellow 114 and 116; examples of orange oil-soluble dye include C. I. Solvent Orange 67; examples of red oil-soluble dye include C. I. Solvent Red 122 and 146; examples of blue oil-soluble dye include C. I. Solvent Blue 5, 36, 44, 63, 70, 83, 105, and 111; examples of black oil-soluble dye include C. I. Solvent Black 3, 7, 27, and 29.

Examples of commercially available oil-soluble dyes include blue dye SBN Blue 701 (available from Hodogaya Chemical Co., Ltd.), blue dye Oil Blue 650 (available from Orient Chemical Industries Co., Ltd.), blue dye Savinyl Blue GLS (available from Clariant K. K.), red dye SOC-1-0100 (available from Orient Chemical Industries Co., Ltd.), OIL BLACK 860, OIL PINK 314, OIL YELLOW 3G, VALIFAST PINK 2310 N, VALIFAST RED 3312, VALIFAST YELLOW CGHN new, VALIFAST YELLOW 1108, and VALIFAST BLACK 3830 (available from Orient Chemical Industries Co., Ltd.).

In the dye-containing particles, 0.2 to 50 mass %, preferably 0.5 to 20 mass %, and more preferably 1.0 to 10 mass % of the dye can be contained with respect to the amount of the dye-containing particles.

The anionic dye-containing particles used in the present invention are preferably fine particles having a particle size of 0.01 to 1.0 μm, and more preferably at least 95 mass % of the anionic dye-containing particles are fine particles having particle sizes within a range of 0.01 to 0.5 μm. The particle size in the range is preferable in order to form good composite colored particles by combination with the cationic resin particles. The shape of the anionic dye-containing particle is preferably spherical and particularly preferably perfectly spherical.

Composite Formation

In the present invention, the composite colored particles can be produced by forming a composite of cationic resin particles with anionic dye-containing particles through the Coulomb force. FIG. 1 schematically illustrates that a resin particle carrying a positive electric charge on a particle surface is combined with a dye-containing particle having a negative electric charge on the particle surface to form a composite colored particle having a large particle size by the Coulomb force.

The composite colored particles of the present invention are stable composite particles having a structure in which a cationic resin particle and anionic dye-containing particles are bonded through the Coulomb force.

The composite colored particles of the present invention can be produced by forming a composite by mixing a resin emulsion containing the cationic resin particles and a colored resin dispersion containing the anionic dye-containing particles.

The blending ratio of the cationic resin particles to the anionic dye-containing particles in the forming of a composite is, in terms of mass ratio of resin particles/dye-containing particles (excluding water-based medium and the like), selected from a range of: preferably 1/0.1 to 1/50; more preferably 1/0.5 to 1/10; and even more preferably 1/1 to 1/5.

In the forming of a composite, a resin emulsion containing resin particles carrying a positive electric charge on particle surfaces and a colored resin dispersion containing dye-containing particles carrying a negative electric charge on particle surfaces are prepared. In each of the emulsion and the dispersion, particles are preferably dispersed in a water-based medium.

Each medium of the water-based emulsion and the dispersion is a water-based medium that is compatible to each other and is preferably water, a water-soluble organic solvent, or a mixed solution of these. The content of the water-based medium in each of the resin emulsion and the colored resin dispersion is preferably 1 to 50 mass %, more preferably 3 to 30 mass %, and even more preferably 5 to 20 mass %, with respect to the total amount of the emulsion or the dispersion. The density of the water-based medium to be used preferably has a density that is close to the density of the particles.

Examples of the water-soluble organic solvents that can be used include at least one of alkylene glycols such as ethylene glycol, triethylene glycol, tetraethylene glycol, propylene glycol, dipropylene glycol, 1,2-propanediol, 1,3-propanediol, 1,2-butanediol, 2,3-butanediol, 1,3-butanediol, 1,4-butanediol, 1,2-pentanediol, 1,5-pentanediol, 2,5-hexanediol, 3-methyl-1,3-butanediol, 2-methylpentane-2,4-diol, 3-methylpentane-1,3,5-triol, and 1,2,3-hexanetriol; polyalkylene glycols such as polyethylene glycol and polypropylene glycol; glycerol such as glycerol, diglycerol, and triglycerol; lower alkyl ethers of glycols such as ethylene glycol monomethyl ether, ethylene glycol monoethyl ether, diethylene glycol monomethyl ether, diethylene glycol monoethyl ether, diethylene glycol mono-n-butyl ether, N-methyl-2-pyrrolidone, and 1,3-dimethyl-2-imidazolidinone.

In addition, water-soluble solvents such as alcohols such as methyl alcohol, ethyl alcohol, isopropyl alcohol, n-butyl alcohol, tert-butyl alcohol, isobutyl alcohol, hexyl alcohol, octyl alcohol, nonyl alcohol, decyl alcohol, benzyl alcohol, and amides such as dimethylformamide and diethylacetamide, and ketones such as acetone may also be mixed. The content of these water-soluble organic solvents varies depending on the type of writing instrument such as a felt-tip pen, a marking pen, and a ball-point pen, and is desirably from 1 to 40% by mass based on the total amount of the ink composition.

Next, the cationic resin emulsion and the anionic colored resin dispersion are mixed. As the mixing method of each emulsion (dispersion), a method in which each emulsion (dispersion) is charged in a container equipped with a stirring equipment, such as a mechanical stirrer or a magnetic stirrer, and then stirred can be employed. At this time, a necessary component to form an ink composition may be added.

The resin particles and the dye-containing particles contained in each of the emulsions effectively form composite colored particles having a large particle size by electrostatically bonding the resin particles and the dye-containing particles through the Coulomb force when being mixed. The composite colored particles obtained by this have extremely small content of colorant fine particles having a particle size of less than 0.1 μm, which is effective to achieve the effect of the present invention.

At this time, some composite colored particles may clump together to form a composite colored particle aggregate having an extremely large particle size of over 10 μm. Because an aggregate having an extremely large particle size may cause problems, such as clogging or thinning of an ink, when used for a writing instrument, a breaking up process where the aggregate is crushed and dispersed into separated composite colored particles is preferably added.

Examples of the breaking up process include a method by stirring using a stirrer such as homomixer, a disper, a mixer, an ultra mixer, or a homogenizer. By the breaking up process, the aggregates having extremely large particle sizes are crushed and converted into separate composite colored particles to forma suitable dispersion liquid of the composite colored particles. By adjusting the stirring conditions of crushing the aggregates, the particle size of the dye-containing particle can be controlled.

The method of producing the dye-containing particles described above can be suitably performed industrially.

In other words, a preferred embodiment of the method of producing a composite colored particle of the present invention is a method including a forming composite process of mixing a resin emulsion containing a resin particle carrying a positive electric charge on a particle surface and a water-based medium, and a colored resin dispersion containing a dye-containing particle carrying a negative electric charge on a particle surface and a water-based medium, and a breaking up process of crushing an aggregate.

For the composite colored particles of the present invention, preferably at least 95% of the composite colored particles have a particle size within a range of 0.2 μm to 3.0 μm, and more preferably at least 95% of the composite colored particles have a particle size within a range of 0.2 μm to 2.0 μm. The content of the fine particles, which are the composite colored particles having a particle size of less than 0.1 μm, is less than 3%, and preferably less than 1%, as the frequency of the particles.

Water-Based Ink Composition

The composite colored particles of the present invention are dispersed in a water-based medium containing other components that have been added based on required characteristics as a writing instrument (e.g., ballpoint pen, marking pen) to form a water-based ink composition for a writing instrument. Examples of such other components constituting the water-based medium include pH adjusters, thickeners, lubricants, corrosion inhibitors, preservatives, antimicrobial agents, and solvents as dispersion media.

The content of the composite colored particles of the present invention in the water-based ink composition is preferably 0.1 to 50 mass %, more preferably 1 to 30 mass %, and even more preferably 3 to 20 mass %, with respect to the total amount of the ink composition from the perspective of ensuring hue of the ink and preventing thinning in writing.

Examples of the pH adjuster for adjusting the pH of the ink composition include amines such as monoethanolamine, diethanolamine, triethanolamine, triisopropanolamine, N,N-dimethylethanolamine, N,N-diethylethanolamine, and morpholine; ureas such as urea, thiourea, and tetramethylurea; allophanates such as allophanate and methyl allophanate; biurets such as biuret, dimethylbiuret, and tetramethylbiuret; quaternary ammoniums such as tetramethylammonium hydroxide; inorganic hydroxides such as sodium hydroxide, potassium hydroxide, and lithium hydroxide; and inorganic salts such as sodium (hydrogen) carbonate, potassium (hydrogen) carbonate, and lithium (hydrogen)carbonate; and at least one type of these can be used.

As the thickener to be blended in the water-based ink composition, for example, synthetic polymers, cellulose, and polysaccharides can be used. Specific examples thereof include gum arabic, gum tragacanth, guar gum, locust bean gum, alginic acid, carrageenan, gelatin, xanthan gum, welan gum, succinoglycan, diutan gum, dextran, methyl cellulose, ethyl cellulose, hydroxyethyl cellulose, carboxymethyl cellulose, starch glycolic acid and salts thereof, propylene glycol ester alginate, polyvinyl alcohol, polyvinylpyrrolidone, polyvinyl methyl ether, polyacrylic acid and salts thereof, carboxyvinyl polymers, polyethylene oxide, vinyl acetate-polyvinyl pyrrolidone copolymers, crosslinked acrylic acid polymers and salts thereof, uncrosslinked acrylic acid polymers and salts thereof, and styrene-acrylic acid copolymers and salts thereof, and at least one type of these can be used.

As the corrosion inhibitor to be blended in the water-based ink composition, benzotriazole, tolyltriazole, dicyclohexylammonium nitrite, and saponins can be used. As the preservative or antimicrobial agent to be blended in the water-based ink composition, phenols, benzoic acids, benzimidazoles, isothiazolones, triazines, bronopols, thiabendazoles, zinc pyrithiones, carbendazims, and omadines can be used.

Examples of the lubricant to be blended in the water-based ink composition include nonionic lubricants such as fatty acid esters of polyhydric alcohols, higher fatty acid esters of sugars, polyoxyalkylene higher fatty acid esters, alkyl phosphates, and alkylpolyoxyalkylene phosphates; anionic lubricants such as alkyl sulfonates of higher fatty acid amides and alkyl aryl sulfonates; fluorine-based lubricants; and silicone-based lubricants such as polyether-modified silicones.

Dispersion Medium

In the water-based ink composition, a dispersion medium is blended to stabilize the dispersion state of the composite colored particles and to ensure usability as an ink for a writing instrument. As the dispersion medium, water such as tap water, purified water, distilled water, ion exchanged water, or pure water, water-soluble organic solvents, or hydrophilic dispersion mediums including mixed solutions thereof can be used. A mixed solution containing water and at least one type of water-soluble organic solvents can be preferably used. The density of the dispersion medium to be used is preferably close to the density of the composite colored particle.

The blended amount of the water-based medium in the water-based ink composition is preferably 3 to 300 parts by mass, and more preferably 5 to 100 parts by mass, per 100 parts by mass of the composite colored particles.

As the water-soluble organic solvent, for example, alcohols, glycols, and derivatives thereof can be used. Specific examples thereof include methanol, ethanol, propanol, butanol, ethylene glycol, diethylene glycol, triethylene glycol, propylene glycol, dipropylene glycol, polyethylene glycol, 3-butylene glycol, thiodiethylene glycol, ethylene glycol monomethyl ether, ethylene glycol monobutyl ether, diethylene glycol monomethyl ether, glycerin, and diglycerin, and at least one type of these can be used. A mixed solvent in which a water-soluble organic solvent is blended in a proportion of 5 to 200 parts by mass per 100 parts by mass of water is preferred.

Furthermore, as the dispersion medium, a hydrophilic nonionic polymer can be used. As the nonionic polymer to be blended in the water-based ink composition, for example, polyethers can be used. Specific examples thereof include polypropylene glycol, polybutylene glycol, and polyoxypropylene diglyceryl ether, and at least one type of these can be used. By using these nonionic polymers as a main solvent, occurrence of aggregation over time of the particles can be prevented.

As the polyethers such as polypropylene glycol and polybutylene glycol to be blended in the water-based ink composition, polyethers having various degrees of polymerization can be used; from the perspective of further exhibiting the effect of the present invention, use of a polymer of polypropylene glycol having a degree of polymerization of 400 to 700 (weight average) is preferred, and use of a polymer of polybutylene glycol having a degree of polymerization of 500 to 700 (weight average) is preferred.

The water-based ink composition for a writing instrument can be produced by, for example, blending predetermined amounts of components to be blended in the composite colored particles and the water-based ink composition, and, stirring and mixing them by a stirrer, such as a homomixer or a disper. Further, coarse particles in the water-based ink composition may be removed by filtration or centrifugation, as necessary.

Writing Instrument

The water-based ink composition of the present invention is loaded in a felt-tip pen body or a marking pen body having a fiber tip, a felt tip, or a plastic tip in a writing tip part or a ballpoint pen body having a ballpoint pen tip in a writing tip part. The writing instrument loaded with the water-based ink composition of the present invention has the advantage of preventing blurring of marking and bleed-through due to soaking into a material when the writing instrument is used to write on a paper or the like and of exhibiting excellent writing capability, such as wash-resistance of marking.

EXAMPLES

The present invention will be described in further detail using examples, but the present invention is not limited to the examples and the like. Note that the unit "part(s)" in blending described below means "part(s) by mass".

Resin Particles

As the emulsion of the cationic resin particles, a water-based emulsion of each of cation-modified vinyl acetate-based resin, cation-modified acrylic resin, or cation-modified urethane-based resin was used.

(A-1) As the cation-modified vinyl acetate-based resin, a cation-modified vinyl acetate-based resin emulsion (VINYBLAN 1008; available from Nissin Chemical Co., Ltd.) was used.

(A-2) As the cation-modified acrylic resin, a cation-modified polyvinyl alcohol-acrylic resin emulsion (Mowinyl 6950; available from Japan Coating Resin Co., Ltd.) was used.

(A-3) As the cation-modified urethane-based resin, a cation-modified urethane emulsion (SUPERFLEX 620; available from DKS Co., Ltd.) was used.

(A-4) For the comparison, a nonionic modified vinyl acetate-based resin emulsion (VINYBLAN 1002; available from Nissin Chemical Co., Ltd.) was used.

Dye-Containing Particles

As the anionic dye-containing particles, colored resin dispersions, in which dye-containing particles were dispersed in a water-based medium, obtained by the methods of Production Examples 1 to 3 described below were used.

Production Example 1: Particles B-1

While 17 parts of triethylene glycol distearate (product name: ESTEPEARL 30, melting point: 44 to 51° C., available from Nikko Chemicals Co., Ltd.) was heated to 65° C., 4 parts of a metal complex-based oil-soluble dye (product name: VALIFAST BLACK 3830, available from Orient Chemical Industries Co., Ltd.) was added thereto and dispersed well. Next, 4 parts of methyl ethyl ketone was added, and 7 parts of a trimethylolpropane-modified product of xylylene diisocyanate (product name: D-110N, available from Mitsui Chemicals, Inc.) was further added and stirred at 65° C., to produce an oil phase solution. Meanwhile, in 600 parts of distilled water heated to 65° C., 10 parts of polyvinyl alcohol (product name: PVA-205, available from Kuraray Co., Ltd.) and 20 parts of an anion-modified polyvinyl alcohol having a sulfonate group (product name: GOHSENX L-3266, available from Mitsubishi Chemical Corporation) were dissolved, to produce an aqueous phase solution. The oil phase solution was added to the obtained aqueous phase solution and then 6 parts of hexamethylenediamine was added and stirred and mixed to complete emulsion polymerization. Thus, an emulsion of dye-containing particles B-1 comprising an anionic urea-urethane-based resin encapsulating the oil-soluble dye was obtained.

The obtained dye-containing resin particles B-1 had a measured value of the surface potential of −28 mV and were anionic. Furthermore, the average particle size of the dye-containing resin particles B-1 was 0.12 μm.

Production Example 2: Particles B-2

A 2-liter flask equipped with a stirrer, a reflux condenser, a thermometer, a nitrogen gas-inlet, and a 1000 mL separating funnel for addition of a monomer was set in a hot water bath, and charged with 329.5 parts of distilled water, 5 parts of glycerin monomethacrylate (product name: BLEMMER GLM, available from NOF Corporation), 5 parts of sodium 2-sulfoethyl methacrylate having a sulfonate group (product name: acrylic ester SEM-Na, available from Mitsubishi Chemical Corporation), 20 parts of an anionic polymerizable surfactant (product name: ADEKA REASOAP SE-10N, available from ADEKA Corporation, ether sulfate), and 0.5 parts of ammonium persulfate, and the internal temperature was increased to 50° C. while nitrogen gas was introduced.

Meanwhile, 40 parts of a metal complex-based oil-soluble dye (product name: Savinyl Blue GLS, available from Clariant K.K.) and 10 parts of triallyl isocyanurate as a crosslinking agent (product name: TAIC, available from Nippon Kasei Chemical Company Limited) were mixed with a mixed monomer including 55 parts of cyclohexyl methacrylate and 35 parts of n-butyl methacrylate, and thus a solution was prepared.

The obtained prepared solution was added to the flask having a temperature maintained at approximately 50° C. through the separating funnel over 3 hours while being stirred, and thus emulsion polymerization was performed. The polymerization was terminated after aging for 5 hours was further performed. Thus an emulsion of the dye-containing particles B-2 comprising anionic acrylic resin encapsulating the oil-soluble dye was obtained.

The obtained dye-containing resin particles B-2 had a measured value of the surface potential of −58 mV and were anionic. Furthermore, the average particle size of the dye-containing resin particles B-2 was 0.04 μm.

Production Example 3: Particles B-3 (for Comparative Example)

While 4 parts of methyl ethyl ketone and 17 parts of triethylene glycol distearate (product name: ESTEPEARL 30, melting point: 44 to 51° C., available from Nikko Chemicals Co., Ltd.) was heated to 65° C., 10.4 parts of an oil-soluble red dye (product name: OIL SCARLET #308, available from Orient Chemical Industries Co., Ltd.) was added thereto and dispersed well. Next, 7 parts of a trimethylolpropane-modified product of xylylene diisocyanate (product name: D-110N, available from Mitsui Chemicals, Inc.) was further added and stirred at 65° C., to produce an oil phase solution. Meanwhile, in 600 parts of distilled water heated to 65° C., 15 parts of polyvinyl alcohol (product name: PVA-205, available from Kuraray Co., Ltd.) was dissolved, to produce an aqueous phase solution. The oil phase solution was added to the obtained aqueous phase solution and then 6 parts of hexamethylenediamine was added and stirred and mixed to complete emulsion polymerization. Thus, an emulsion of dye-containing particles B-3 containing a nonionic urea-urethane-based resin encapsulating the oil-soluble dye was obtained.

Examples 1 to 6 and Comparative Examples 1 and 2

The resin particle emulsions described above and the dye-containing particle emulsions produced in Production Examples was each blended in the combination and at the mass ratio (mass ratio of solid content) as listed in Table 1, mixed by using a stirrer, and thus water-based dispersions of R-1 to R-8 were obtained. Then, intense stirring was performed by using a homomixer and breaking up was performed. Thus composite colored particles P-1 to P-6 as Examples and composite colored particles C-1 and C-2 as Comparative Examples were each obtained in a water-based dispersion state having a solid content of 20 mass %.

Figure 2:
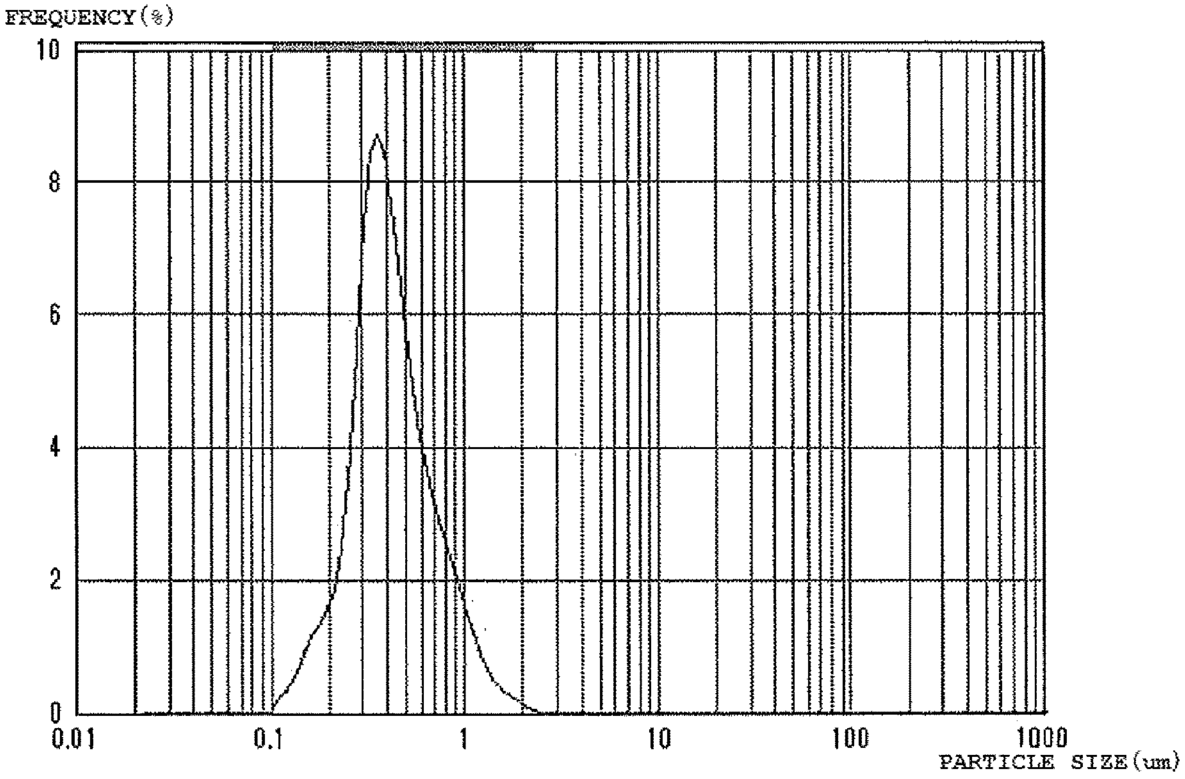
FIG. 2 is a particle-size frequency distribution of the composite colored particles P-1 that were obtained by performing breaking up in Example 1.

The frequency distribution of the particle sizes of the cation-modified vinyl acetate resin used in Example 1 is shown in FIG. 2, and the frequency distribution of the particle sizes of the anionic dye-containing particles is shown in FIG. 3. The frequency distribution of the particle sizes of the composite colored particles before the performance of the breaking up in Example 1 is shown in FIG. 4, and the frequency distribution of the particle sizes of the composite colored particles after the performance of the breaking up operation thereto is shown in FIG. 5.

Furthermore, for the composite colored particles produced in each of Examples 1 to 6 and Comparative Examples 1 and 2, the frequency distribution of the particle sizes was measured, and the frequency percentage (%) of the composite colored particles having a particle size in a specific range with respect to the entire composite colored particles was determined. The results are shown in Table 2.

According to these charts and tables, it is clear that the composite colored particles of the present invention were composed of particles having large particle sizes, and almost no dye-containing fine particles having small particle sizes were included.

Note that the particle size distributions of the cationic resin particles and the composite colored particles were measured by laser diffraction analysis using a particle size distribution analyzer (MICROTRAC HRA 9320-X100; available from Nikkiso Co., Ltd.). The particle size distribution of the anionic dye-containing particles was measured by a dynamic light scattering method using a concentrated particle size analyzer (FPAR-1000; available from Otsuka Electronics Co., Ltd.).

Examples 11 to 19 and Comparative Examples 11 and 12

By using each of the dispersions of the composite colored particles P-1 to P-6 as Examples and dispersions of the composite colored particles C-1 and C-2 as Comparative Examples, a pH adjuster, a preservative, and a dispersion medium were blended in the combination and at the weight ratio as listed in Table 3 and mixed, a little aggregates were removed. Thus a dispersion of a water-based ink composition was prepared.

The ink compositions of Examples 11 to 19 are water-based ink compositions of the present invention. The ink composition of Comparative Example 11 is a comparative example using no cationic resin particles, and the ink composition of Comparative Example 12 is a comparative example using no anionic dye-containing particles.

Evaluation of Ink Composition

A felt-tip pen was produced by using each of the prepared water-based ink compositions. Specifically, in an ink container of a commercially available felt-tip pen (product name: PROCKEY PM-120T; available from Mitsubishi Pencil Co., Ltd., fine point+extra fine point), each of the ink compositions produced in Examples 1 to 8 and Comparative Examples 1 to 5 was filled, and thus a felt-tip pen was produced. Writing was performed by using a round core of fine point side of each of the produced felt-tip pens, writing performances such as the thickness of a drawn line (marking) in writing, prevention of blurring, and scratch resistance were tested by the following methods and evaluated. The results are shown in Table 3.

1) Thickness of Drawn Line 1-1) Writing on Paper

By using each of the felt-tip pens, a spiral was hand drawn on a surface of a writing paper that was in conformity with ISO standards, and then the thickness of the drawn line was evaluated based on the following criteria by visually observing the surface of the paper.

1-2) Writing on Cloth

By using each of the felt-tip pens, the characters "Mitsubishi Pencil" was hand written on a surface of a cotton cloth (Kanakin No. 3; for staining of colour fastness test of JIS (in conformity with JIS L 0803)), and then the thickness of the drawn line was evaluated based on the following criteria by visually observing the surface of the cotton cloth.

Evaluation Criteria for Drawn Line:

A: The color of the drawn line was remarkably thick.

B: The color of the drawn line was thick. C: The color of the drawn line was slightly faint.

D: The color of the drawn line was remarkably faint.

2) Prevention of Blurring 2-1) Blurring on Paper

By using each of the felt-tip pens, a spiral was hand drawn on a surface of a writing paper that was in conformity with ISO standards, and then the blurring state of the drawn line was evaluated based on the following criteria by visually observing the surface of the paper.

2-2) Blurring on Cloth

By using each of the felt-tip pens, the characters "Mitsubishi Pencil" was hand written on a surface of a cotton cloth (Kanakin No. 3; for staining of colour fastness test of JIS (in conformity with JIS L 0803)), and then the blurring state of the drawn line was evaluated based on the following criteria by visually observing the surface of the cotton cloth.

Evaluation Criteria for Blurring Condition:

A: No blurring of the drawn line was observed.

B: Slight blurring of the drawn line was observed.

C: Considerable blurring of the drawn line was observed.

D: Remarkable blurring of the drawn line was observed.

3) Scratch Resistance

By using each of the felt-tip pens, the characters "Mitsubishi Pencil" was hand written on a surface of coated paper (available from Yupo Corporation), and then the marking was dried. A paper wiper (Kimwipes; available from Nippon Paper Crecia Co., Ltd.) was placed on this marking, a weight of 500 g was placed thereon, and the marking was rubbed by horizontally moving the paper wiper together with the weight between one point and another point for five times. The condition of the marking thereafter was evaluated based on the following criteria.

Evaluation Criteria for Scratch Resistance:

A: No defects occurred in the marking.

B: One or two defects of thin lines occurred in the marking.

C: Clear defects occurred in the marking.

D: Significant defects occurred to the degree that made it difficult to read the characters.

TABLE 1

Composition of composite colored particle (part by mass)

| | | | Examples | | | | | | Comparative Examples | |
|---|---|---|---|---|---|---|---|---|---|---|
| | | | 1 | 2 | 3 | 4 | 5 | 6 | 1 | 2 |
| Resin particle | Cation-modified vinyl acetate-based resin | A-1 | 30 | 40 | | | | | | 40 |
| | Cation-modified acrylic resin | A-2 | | | 35 | 50 | | | | |
| | Cation-modified urethane-based resin | A-3 | | | | | 20 | 25 | | |
| | Nonionic modified vinyl acetate-based resin | A-4 | | | | | | | 30 | |
| Dye-containing particle | Anionic urea-urethane-based resin fine particle | B-1 | 70 | | 65 | | 80 | | 70 | |
| | Anionic acrylic resin fine particle | B-2 | | 60 | | 50 | | 75 | | |
| | Nonionic urea-urethane-based resin fine particle | B-3 | | | | | | | | 60 |
| Composite colored particle | Number | | P-1 | P-2 | P-3 | P-4 | P-5 | P-6 | C-1 | C-2 |

TABLE 2

Frequency percentage of composite colored particles in specific particle size range

| | Example particle number | | | | | | Comparative Example particle number | |
|---|---|---|---|---|---|---|---|---|
| Particle size range | P-1 | P-2 | P-3 | P-4 | P-5 | P-6 | C-1 | C-2 |
| 0.2 μm to 3.0 μm | 96.80% | 100.00% | 100.00% | 100.00% | 99.20% | 98.20% | 99.00% | 100.00% |
| 0.2 μm to 2.0 μm | 96.40% | 98.20% | 99.40% | 98.00% | 97.20% | 96.30% | 97.30% | 98.10% |
| less than 0.1 μm | 0.00% | 0.00% | 0.00% | 0.00% | 0.30% | 0.00% | 0.20% | 0.00% |

TABLE 3

Water-based ink composition (part by mass)

| | | | Examples | | | | | | | | | Comparative Examples | |
|---|---|---|---|---|---|---|---|---|---|---|---|---|---|
| Component | Details | | 11 | 12 | 13 | 14 | 15 | 16 | 17 | 18 | 19 | 11 | 12 |
| Composite colored particle *1 | P-1 | | 43 | 56 | | | | | | | | | |
| | P-2 | | | | 52 | 68 | | | | | | | |
| | P-3 | | | | | | 60 | 54 | | | | | |
| | P-4 | | | | | | | | 38 | | | | |
| | P-5 | | | | | | | | | 52 | | | |
| | P-6 | | | | | | | | | | 45 | | |
| | C-1 | | | | | | | | | | | 43 | |
| | C-2 | | | | | | | | | | | | 52 |
| pH modifier | Triethanolamine | | 0.1 | 0.1 | 0.1 | 0.1 | 0.1 | 0.1 | 0.1 | 0.1 | 0.1 | 0.1 | 0.1 |
| Preservative | Benzoisothiazolone | *2 | 0.3 | 0.3 | 0.3 | 0.3 | 0.3 | 0.3 | 0.3 | 0.3 | 0.3 | 0.3 | 0.3 |
| Dispersion | Glycerin | | 10.3 | 10.3 | 10.3 | 10.3 | 10.3 | 10.3 | 10.3 | 10.3 | 10.3 | 10.3 | 10.3 |

TABLE 3-continued

| Water-based ink composition (part by mass) | | | | | | | | | | | | | |
|---|---|---|---|---|---|---|---|---|---|---|---|---|---|
| | | | Examples | | | | | | | | | Comparative Examples | |
| Component | Details | | 11 | 12 | 13 | 14 | 15 | 16 | 17 | 18 | 19 | 11 | 12 |
| medium | Distilled water | | 46 | 33 | 37 | 21 | 29 | 35 | 51 | 37 | 44 | 46 | 37 |
| Writing performance evaluation | Thickness in drawn line | (Paper) | A | A | A | A | A | A | A | A | A | D | D |
| | " | (Cloth) | A | A | A | A | A | A | A | A | A | D | D |
| | Prevention performance of blurring | (Paper) | A | A | A | A | A | A | A | A | A | C | C |
| | " | (Cloth) | B | B | B | B | B | B | B | B | B | D | D |
| | Scratch resistance | | A | A | A | A | A | A | A | A | A | C | C |

*1: Dispersion having a solid content concentration of 20
*2: BIODEN 421 [available from Daiwa Chemical Industries Co., As is clear from Examples described above, the ink compositions using the composite colored particles of the present invention exhibited excellent densities of drawn lines (marking) at the time of writing, prevention performances of blurring, and scratch resistances.

INDUSTRIAL APPLICABILITY

The ink composition containing the composite colored particles of the present invention can be suitably used for uses in writing instruments, such as felt-tip pens and ball-point pens.

According to the present invention, the composite colored particles that impart excellent usability to the ink composition are advantageously produced industrially.

REFERENCE SIGNS LIST

1 Dye-containing particle carrying a negative electric charge on a particle surface

2 Resin particle carrying a positive electric charge on a particle surface

The invention claimed is:

1. A writing instrument, comprising:

a water-based ink composition comprising composite colored particles dispersed in a water-based medium, wherein each of the composite colored particles comprises (i) a resin particle carrying a positive electric charge on a particle surface and (ii) a dye-comprising particle carrying a negative electric charge on a particle surface, wherein the resin particle and the dye-comprising particle form the composite colored particle through Coulombic force, wherein at least 95% of the composite colored particles have a particle size in a range of from 0.2 to 3.0 μm, and wherein, in the water-based ink composition, a content of the composite colored particles having a particle size of less than 0.1 μm is less than 3%, as a frequency of the composite colored particles, wherein the water-based ink composition is loaded in a felt-tip pen body, a marking pen body, or a ballpoint pen body.

2. The writing instrument of claim 1, wherein the resin particle (i) comprises a polymer modified with a cationic group.

3. The writing instrument of claim 2, wherein the polymer modified with a cationic group is at least one selected from the group consisting of a vinyl acetate-based resin, an acrylic resin, and a urethane-based resin.

4. The writing instrument of claim 2, wherein the polymer modified with a cationic group comprises a urethane-based resin.

5. The writing instrument of claim 1, wherein the dye-comprising particle (ii) comprises an anionic resin particle comprising a dye inside the anionic resin particle.

6. The writing instrument of claim 1, wherein the resin particle (i) comprises at least one selected from the group consisting of an acrylic resin, a urea-based resin, a urethane-based resin, and a urea-urethane-based resin.

7. The writing instrument of claim 1, wherein the dye-comprising particles comprise an anionic resin particle comprising a dye on a surface of the anionic resin particle.

8. The writing instrument of claim 1, which is a felt-tip pen.

9. The writing instrument of claim 1, which is a marking pen.

10. The writing instrument of claim 1, which is a ballpoint pen.

11. The writing instrument of claim 1, wherein the composite colored particles are produced by a method comprising mixing a resin emulsion comprising a resin particle carrying a positive electric charge on a particle surface and a water-based medium, and a colored resin dispersion comprising a dye-comprising particle carrying a negative electric charge on a particle surf ace and a water-based medium, to form an aggregate of a composite; and a crushing the aggregate, thereby breaking up the aggregate.

12. The writing instrument of claim 1, wherein the resin particle (i) is present in the composite colored particles, relative to the dye-comprising particle (ii), in a blending ratio in a range of from 1/0.1 to 1/50.

13. The writing instrument of claim 1, wherein the resin particle (i) is present in the composite colored particles, relative to the dye-comprising particle (ii), in a blending ratio in a range of from 1/0.5 to 1/10.

14. The writing instrument of claim 1, wherein the resin particle (i) is present in the composite colored particles, relative to the dye-comprising particle (ii), in a blending ratio in a range of from 1/1 to 1/5.

15. The writing instrument of claim 1, wherein the resin particle comprises a vinyl acetate-based resin modified with a cationic group.

16. The writing instrument of claim 1, wherein the resin particle comprises an acrylic resin modified with a cationic group.

* * * * *